United States Patent Office 3,409,451
Patented Nov. 5, 1968

3,409,451
REFRACTORY COMPOSITES AND METHOD
OF MAKING THE SAME
Karl J. Zeitsch, Karlsruhe, Germany, assignor to Union
Carbide Corporation, a corporation of New York
No Drawing. Continuation-in-part of application Ser. No.
524,494, Feb. 2, 1966. This application Nov. 28, 1967,
Ser. No. 686,308
8 Claims. (Cl. 106—56)

ABSTRACT OF THE DISCLOSURE

An impermeable, refractory oxidation resistant composite and method for producing the same, the method comprising, preparing a mixture of graphite or coke and a coat promoting material composed of silicon plus either zirconium dioxide or hafnium dioxide, and then subjecting the mixture to a simultaneous temperature and pressure sufficient to deform the grains of carbonaceous material and to melt at least part of the coat promoting material.

This application is a continuation in part of application Ser. No. 524,494, filed Feb. 2, 1966, now abandoned.

BACKGROUND OF THE INVENTION

Field of invention

The present invention relates to and has for its principal object the manufacture of impermeable refractory composites that are both oxidation resistant and machinable.

Description of the prior art

There has recently been discovered a process for manufacturing a unique form of physically strong structural graphite which has a bulk density more nearly approaching the real density of graphite than does the bulk density of conventionally manufactured graphite. This new form of graphite is produced by subjecting a carbonaceous starting material, including binder, to sufficient heat and pressure to cause plastic deformation of the individual grains of the starting material. The plastic deformation substantially eliminates pores within and between individual grains, and the resulting graphite has a grain structure characteristic of wrought materials in that the individual grains are elongated substantially in the direction normal to the application of force in working the material.

It has now been unexpectedly discovered that by employing somewhat similar processing techniques with mixtures of carbonaceous material and certain other suitable materials which are set forth below, it is possible to provide impermeable, machinable, oxidation resistant refractory composites which will acquire a self-healing protective surface coating when exposed to oxidizing atmospheres.

SUMMARY OF THE INVENTION

In accordance with the present invention, such refractory composites comprise graphite and one or more materials which promote a protective surface coating when the composite is exposed to oxidizing atmospheres, the graphite and the material being in the "semi-alloyed" state throughout the entire composite. Since in the practice of the invention, the carbonaceous content of the composites is always in excess of the limits of solubility for carbon in the non-carbonaceous materials, the composites are not true alloys, but since extensive regional alloying does occur due to the fact that the composites are formed at temperatures where molten phases occur the term "semi-alloy" is believed to accurately describe the composites of the invention.

The process of the invention employed for providing such semi-alloyed composites comprises mixing finely divided carbonaceous material such as graphite or coke including preferably a thermoplastic carbonaceous binder, and a material which will form a protective surface coating on the composite when the composite is exposed to oxidizing atmospheres; and subjecting the mixture of a simultaneous temperature and pressure sufficiently high to effect plastic deformation of the individual grains of the carbonaceous material, the temperature and pressure being also sufficiently high to partially melt the material which is primairly responsible for forming the protective surface coating, and to graphitize the carbonaceous material.

The process is carried beyond the point where a liquid phase occurs in the mixture which is under pressure, due to the melting of at least one of the protective coat formers. Accordingly, with the finely-divided carbonaceous material being in a state of plastic compression, this liquid phase is squeezed into the pores of the solid carbonaceous phase, thus providing upon cooling, an impervious, semi-alloyed composite which is also highly oxidation resistant and machinable.

The particular protective coat forming material in the starting mixture may be any material which will form an oxidation resistant coat on the composite when the composite is exposed to oxidizing atmospheres and which is capable of being fluidized so that it may become semi-alloyed with the solid carbonaceous phase. The preferred materials for this purpose are selected from two groups, at least one component being selected from each group. The first group includes a material capable of forming, upon exposure to oxygen, a network melt and the second group includes a material similarly capable of forming a network supporter. These materials may be incorporated in the elemental state or in the form of compounds. The protective surface coat promoting material is preferably present in the starting mixture in an amount between about 10 and about 130 parts per hundred based on the amount of carbonaceous material therein. The material should be added to the starting mixture in finely divided form, preferably in a size passing 200 Tyler mesh screens. A full disclosure of the process and the coat forming materials above-described is set forth in co-pending U.S. application Ser. No. 660,194 entitled, "Refractory Composites and Method of Making the Same," filed on Aug. 14, 1967, and said application is incorporated herein by reference thereto.

The process of this invention includes as a coat forming material silicon plus zirconium dioxide or hafnium dioxide.

It is essential in the inventive process that the starting mixture be subjected in a non-oxidizing atmosphere to a simultaneous temperature and pressure sufficient to render at least part of the protective coat forming material molten and to cause the carbonaceous structure to undergo plastic flow and yet prevent fracture thereof. At no time during processing should the pressure exceed the compressive strength of the material being treated at the particular temperature employed. The minimum temperature which must be employed to produce the semi-alloyed refractory composites of this invention depends in part on the thermal history of the carbonaceous starting material, but in any event must be a temperature sufficient to graphitize the carbonaceous starting material and to render at least part of the surface coat forming material molten. A temperature of approximately 1700° C. has been found to be the minimum acceptable temperature and temperatures in the order of 1800° C. are generally employed.

The inclusion of a carbonaceous binder in the starting mixture is not absolutely necessary, but is highly beneficial. The binder when present allows dense compacting of the mixture when processed according to the teaching of the invention due to extensive liquefaction in the compressed mixture, and since the binder aids in forming a carbonaceous skeleton throughout the composite, it not only provides the resulting semi-alloyed composite with a respectable residual strength when exposed, in service, to temperatures in or above the range called for in the processing, but also prevents excessive escape of the molten protective coat forming materials during processing by trapping them in the pores of the carbonaceous skeleton. Since the binder may be omitted entirely, the quantity included if used may be varied at the desire of the practitioner and it is well within the skill of the artisan to determine a proper amount. As illustrated in Table 1, about 22.5 percent by weight carbonaceous pitch based on the total carbonaceous material in the starting mixture has been found to be a satisfactory quantity to employ.

Examples of starting mixtures which have been successfully employed to make the semi-alloyed composites of the invention when processed under sufficient temperature and pressure conditions as outlined above, the processing being carried out in a standard mold designed to withstand the above-described temperatures and pressure, are set forth below.

The graphite flour employed in each case had a particle size such that 45 to 55% by weight passed through a 200 Tyler mesh screen, and the binder in each case was 175° pitch. The protective coat forming materials generally had a particle size which passed through 200 Tyler mesh.

TABLE 1

| Graphite Flour, percent by weight | Pitch Binder, percent by weight | Protective Coat Forming Material, parts per hundred of carbonaceous material graphite plus pitch |
|---|---|---|
| 77.5 | 22.5 | 64 $ZrO_2$, 37 Si |
| 77.5 | 22.5 | 64 $HfO_2$, 37 Si |

For each composition set forth in Table 1, the preferred temperature and pressure gradients were determined based upon the exact carbonaceous material to protective coat forming material ratio and the chemical stability of the protective coat forming material. While it will be appreciated that the optimum temperature and pressure will vary from composition to composition, one skilled in the art, after a reading of this application may readily determine a temperature and pressure which will be sufficient to insure the melting of at least a part of the protective coat forming materials, and the plastic deformation and graphitization of the individual grains of carbonaceous material, which will thereby insure the successful processing of the semi-alloyed refractory composites of the invention.

In order to provide the composites of the invention, it was found necessary for the above compositions to employ a temperature in excess of about 1800° C. and a pressure in excess of about 2500 p.s.i. Furthermore the processing time was in the order of thousands of seconds. The composites formed from the above compositions were found to be in the semi-alloyed state and were impermeable and machinable. In addition, when the composites were subjected to oxidizing conditions a self-healing protective coating was formed on the surface.

In order to illustrate the effectiveness of the above-described composites a number of samples ¼″ x ¼″ x 2″ were tested for weight loss after ten minutes in air at various temperatures. The samples were heated by passing an electric current therethrough. Table 2 tabulates the results of the tests and includes for comparative purposes, results obtained from identical tests performed on a composite which forms part of the subject matter of the above-identified copending application.

TABLE 2

| Composite (Graphite and Pitch in percent by weight) | Weight Loss (percent by weight) Temperature ° C. | | | | |
|---|---|---|---|---|---|
| | 1,400 | 1,500 | 1,600 | 1,700 | 1,800 |
| 77.5% Graphite, 22.5% Pitch, 82.5 $ZrB_2$ (p.p.h.) and 18.5 Si (p.p.h.) | 1.75 | 1.90 | 2.30 | 3.40 | 7.00 |
| 77.5% Graphite, 22.5% Pitch, 64 $ZrO_2$(p.p.h.), 37 Si (p.p.h.) | 8.36 | 6.60 | 5.44 | 5.08 | 5.31 |
| 77.5% Graphite, 22.5% Pitch, 64 $HfO_2$(p.p.h.) 37 Si (p.p.h.) | 6.66 | 6.75 | 5.98 | 5.44 | 6.15 |

The composites of the subject invention resist oxidation comparatively well at low temperatures and extremely well at high temperatures, providing excellent protection at 1800° C., for example.

It will be appreciated that some variation of the proportions of the ingredients in the composites of this invention will not substantially affect the oxidation resistant protection provided. For example, between 32 percent to 62 percent by weight of the mixture is preferably non-carbonaceous protective coat forming material that is, silicon plus zirconium dioxide or hafnium dioxide. The remaining percentage is composed of carbonaceous material, that is, either coke or graphite with or without a carbonaceous binder. The silicon to refractory-dioxide weight ratio is preferably in the range of 3:2 to 4:1 or from about 10 to 20 percent silicon in the starting mixture. Expressed in parts per hundred, the non-carbonaceous content of the starting mixture is preferably about 50 to 160 parts per hundred based on the carbonaceous material, although as low as 10 parts per hundred has imparted the desired oxidation resistant character to the end product; approximately 20–40 parts per hundred is silicon.

What is claimed is:
1. A process for producing an impermeable, oxidation-resistant, machinable, refractory composite which is in the semi-alloyed state, said process comprising
   (a) preparing a mixture of finely divided carbonaceous material selected from the group consisting of graphite and coke and a material which will promote a self-healing oxidation resistant protective surface coating when said composite is subjected to oxidizing atmospheres, said material consisting of a mixture of silicon and a compound selected from the group consisting of zirconium dioxide and hafnium dioxide; said material being present in an amount between 10 and about 160 parts per hundred based on the amount of said carbonaceous material, said silicon being in a weight ratio of between about 3:2 to 4:1 with respect to said dioxide;
   (b) and subjecting said mixture in a non-oxidizing atmosphere to a graphitizing temperature and during such heating applying a pressure sufficiently high to effect plastic deformation of the individual grains of said carbonaceous material, said temperature being also sufficiently high to melt at least a part of said protective coat promoting material.
2. The process of claim 1 wherein said mixture contains a carbonaceous thermoplastic binder.
3. The process of claim 1 wherein said temperature is at least 1700° C. and said pressure is at least 2500 pounds per square inch.
4. The process of claim 2 wherein said coat promoting material is present in an amount between 50 and 160 parts per hundred based on said carbonaceous material plus binder.
5. The process of claim 1 wherein said silicon is present in an amount of between 20 and 40 parts per hundred based on said carbonaceous material.
6. An impermeable, machinable, refractory composite which forms a self-healing oxidation-resistant surface coating when subjected to oxidizing atmospheres, said refractory composite consisting essentially of a mixture of graphite and an oxidation resistant surface coat promoting material which consists of a mixture of silicon and a compound selected from the group consisting of zirconium dioxide and hafnium dioxide, said coat promoting material being present in an amount between 10 to 160 parts per hundred based on the amount of graphite, said silicon being in a weight ratio of between 3:2 to about 4:1 with respect to said dioxide.

7. The composite of claim 6 wherein said coat promoting material consists of about 64 parts per hundred $ZrO_2$ and about 37 parts per hundred silicon based on the amount of said graphite.

8. The composite of claim 6 wherein said coat promoting material consists of about 64 parts per hundred $HfO_2$ and about 37 parts per hundred silicon based on the amount of said graphite.

References Cited

UNITED STATES PATENTS

| | | | |
|---|---|---|---|
| 2,013,625 | 9/1935 | Buck | 106—56 |
| 3,143,413 | 8/1964 | Krapf | 106—56 |

JAMES E. POER, *Primary Examiner.*

PO-1050
(5/69)

UNITED STATES PATENT OFFICE
CERTIFICATE OF CORRECTION

Patent No. 3,409,451    Dated July 28, 1969

Inventor(s)   Karl J. Zeitsch

It is certified that error appears in the above-identified patent and that said Letters Patent are hereby corrected as shown below:

Col. 4 line 27 of the specification "-3:2 to 4:1-" should read -- -2:3 to 1:4- --.

Col. 4 line 50 of claim 1 "-3:2 to 4:1-" should read -- -2:3 to 1:4- --.

Col. 5 line 6 of claim 6 "-3:2 to 4:1-" should read -- -2:3 to 1:4- --.

SIGNED AND
SEALED
APR 7 1970

(SEAL)
Attest:

Edward M. Fletcher, Jr.
Attesting Officer

WILLIAM E. SCHUYLER, JR.
Commissioner of Patents